(No Model.)
J. D. SHAW & B. F. ATWOOD.
REIN HOLDER.
No. 460,664. Patented Oct. 6, 1891.
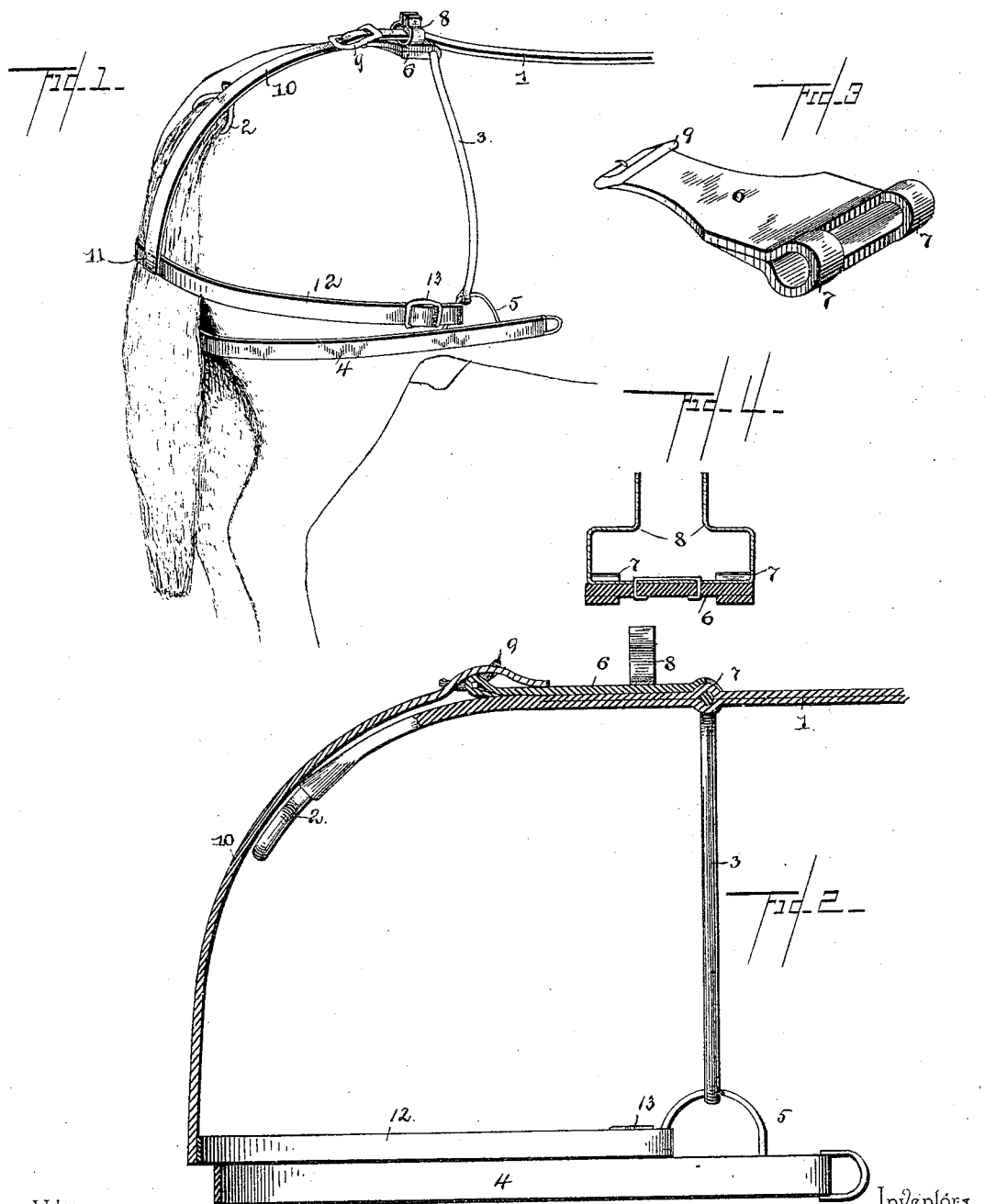
Witnesses:
H. G. Seitz
H. S. Duvall
Inventors
John Douglass Shaw and
Benjamin Franklin Atwood.
By their Attorneys,
C. A. Snow & Co.

UNITED STATES PATENT OFFICE.

JOHN DOUGLASS SHAW AND BENJAMIN FRANKLIN ATWOOD, OF CADIZ, KENTUCKY.

REIN-HOLDER.

SPECIFICATION forming part of Letters Patent No. 460,664, dated October 6, 1891.

Application filed April 28, 1891. Serial No. 390,856. (No model.)

*To all whom it may concern:*

Be it known that we, JOHN DOUGLASS SHAW and BENJAMIN FRANKLIN ATWOOD, citizens of the United States, residing at Cadiz, in the county of Trigg and State of Kentucky, have invented a new and useful Rein Holder and Guard, of which the following is a specification.

This invention relates to rein holders and guards for harnesses; and the objects in view are to provide a cheap and simple attachment adapted to be applied to the ordinary harness and to so guard the reins as to prevent engaging the same by the movements of the horse's tail.

Other objects and advantages of the invention will appear in the following description, and the novel features thereof will be particularly pointed out in the claim.

Referring to the drawings, Figure 1 is a perspective of the rear portion of a harness, the same being provided with a rein-guard attachment constructed in accordance with our invention. Fig. 2 is a vertical longitudinal section. Fig. 3 is a detail in perspective of the strap for connecting the attachment to the back-strap. Fig. 4 is a transverse section in detail through the attaching-strap and guide-loop.

Like numerals of reference indicate like parts in all the figures of the drawings.

1 denotes the back-strap of a harness, which, as usual, terminates at its rear end in a crupper-loop 2, and through the back-strap in advance of the loop passes transversely the hip-strap 3, the terminals of which are designed to depend at opposite sides of the horse.

4 designates the breeching-strap, provided near its ends with the keepers 5, with which keepers the ends of the hip-straps connect.

6 denotes the attaching-strap, and the same is of triangular shape, as shown, and provided at its base with a pair of forwardly-disposed loops 7. These loops embrace the back-strap 1 and loosely receive the hip-strap at each side of the back-strap. The attaching-strap is provided upon its upper side with a rein-guiding loop 8 of substantially U shape, the terminals of the loop being inwardly disposed and slightly deflected so as to readily receive the reins. At its rear reduced end there is located upon the attaching-strap a buckle 9, which is adjustably connected with a rearwardly-disposed stay-strap 10, the rear end of which is secured by stitches 11 or otherwise to the center of the guard-strap 12. The guard-strap 12 is provided at its ends with buckles 13 and is of sufficient length to loosely encompass the hind quarters of a horse and be connected at its terminals in an adjustable manner to the keepers 5 of the breeching.

When in position, it will be observed that the lines are guided by the guide-loop 8 and prevented from falling to the sides of the horse, and thereby engaging with any of the buckles or other projections, and are maintained directly upon the back of the animal. It will also be observed that while the tail of the horse may be switched from side to side the guard 12 will prevent such unlimited switching or swinging of the tail in such manner as would render it liable to engage with or be thrown over the reins, said guard rising and falling with the movements of the tail, but traversing said tail at such a point as to prevent the undesirable swinging.

It will be observed that by means of the buckles at the ends of the guard-strap and at the upper end of the stay-strap the device may be readily removed at any time and may be adjusted to suit different-sized horses.

Having described our invention, what we claim is—

The herein-described improved rein-holder, the same consisting of the attaching-strap 6, terminating at its front end in a pair of loops adapted to embrace the back-strap and loosely receiving the hip-strap at opposite sides of the back-strap and at its rear end provided with a buckle, the stay-strap adjustably connected to the buckle, the guard-strap 12, connected at its center to the stay-strap and adapted at its ends for connection with the keepers of the breeching, and the U-shaped metal guide-hook 8, secured upon the attaching-strap, substantially as specified.

In testimony that we claim the foregoing as our own we have hereto affixed our signatures in presence of two witnesses.

JOHN DOUGLASS SHAW.
BENJAMIN FRANKLIN ATWOOD.

Witnesses:
I. H. McATEE,
IRWIN S. HOLLOWELL.